United States Patent

[11] 3,618,978

| [72] | Inventors | Edwin H. Klove, Jr.<br>Bloomfield Hills;<br>James S. McDaniel, Birmingham; James L. Noll, Livonia, all of Mich. |
|---|---|---|
| [21] | Appl. No. | 36,080 |
| [22] | Filed | May 11, 1970 |
| [45] | Patented | Nov. 9, 1971 |
| [73] | Assignee | General Motors Corporation<br>Detroit, Mich. |

[54] INFLATABLE RESTRAINT FOR VEHICLE OCCUPANT
1 Claim, 3 Drawing Figs.

[52] U.S. Cl. ............................................. 280/150 AB,
   206/DIG. 30
[51] Int. Cl. ............................................... B60r 21/10
[50] Field of Search .......................................... 280/150;
   206/DIG. 30, 19.5; 244/122 R

[56] References Cited
UNITED STATES PATENTS

| 2,212,128 | 8/1940 | Richter | 206/DIG. 30 |
| 2,834,606 | 5/1958 | Bertrand | 280/150 |
| 3,473,824 | 10/1969 | Carey et al. | 280/150 |
| 3,477,740 | 11/1969 | Hass | 280/150 |
| 3,514,125 | 5/1970 | Nemecek | 280/150 |

FOREIGN PATENTS

| 953,312 | 3/1964 | Great Britain | 280/150 |

*Primary Examiner*—Kenneth H. Betts
*Attorneys*—Herbert Furman and W. E. Finken

ABSTRACT: A vehicle includes a seat and a seat cushion and a seat back for supporting an occupant in seated position, an instrument panel having a frontal surface spaced from and juxtaposed to the seat back, and a source of pressure fluid releasable in response to the vehicle receiving an acceleration pulse of predetermined amplitude and time. The occupant restraint includes an inflatable cushion which is normally rolled upon itself and located below the frontal surface of the instrument panel in communication with the source of pressure fluid. When the pressure fluid is released, the cushion unrolls along the knees and upper leg portions of the seated occupant and along the frontal surface of the instrument panel and into engagement with the torso of the occupant to thereby apply a downward and rearward force on the seated occupant and fill the space between the frontal surface of the instrument panel and the upper leg portions and torso of the occupant.

PATENTED NOV 9 1971  3,618,978

INVENTORS
Edwin H. Klove, Jr.,
James S. McDaniel, &
James L. Noll
BY Herbert Furman
ATTORNEY

INFLATABLE RESTRAINT FOR VEHICLE OCCUPANT

This invention relates to an occupant restraint for vehicles and more particularly to an inflatable cushion for restraining movement of a seated occupant relative to the instrument panel of the vehicle when the vehicle and occupant are subjected to acceleration pulses of predetermined amplitude and time.

Inflatable cushion restraint systems for vehicle occupants are well known and generally include a source of pressure fluid, a sensor controlling the release of the pressure fluid when the vehicle receives an acceleration pulse of predetermined amplitude and time, and a manifold for receiving the released pressure fluid and distributing it to an inflatable cushion to inflate the cushion in the space between the occupant and the frontal surface of the instrument panel of the vehicle.

When deflated the cushion is conventionally accordion pleated generally symmetrically about the manifold and located in general alignment with or normal to the torso or head of the occupant, depending on his stature or percentile and seated attitude, and at about the vertical center of the frontal surface of the instrument panel. Thus, when the cushion is inflated, it is deployed in a direction such that it does not apply any downward and rearward components of force on the seated occupant to prevent his submarining or moving underneath the cushion.

The occupant restraint of this invention overcomes the disadvantages of such known systems by providing an inflatable cushion which is deployed in an upward and rearward direction from below the frontal surface of the instrument panel rather than from the vertical center of such surface and, further, which applies a downward and rearward force on the seated occupant to restrain submarining or movement of the occupant underneath the inflated cushion.

In the preferred embodiment of the invention, the deflated cushion is stored in a rolled condition below the frontal surface of the instrument panel, with the coil extending generally upwardly with respect to the vehicle. Upon inflation of the cushion by the pressure fluid, the cushion unrolls and deploys in a direction rearwardly and upwardly of the vehicle between the frontal surface of the instrument panel and the occupant's knees, with an upper wall portion of the cushion unrolling along the frontal surface of the instrument panel, a lower wall portion of the cushion unrolling along the knees and upper leg portions of the occupant, and an end wall portion of the cushion, which joins the upper and lower wall portions, engaging the torso of the occupant. The cushion thus applies a rearward and downward force to the seated occupant tending to maintain the occupant in seated attitude and also, of course, fills the space between the frontal surface of the instrument panel and the occupant. Thus, the cushion walks up the seated occupant after initial engagement with his legs.

One feature of this invention is that it provides an occupant restraint system having an inflatable cushion which is deployed generally rearwardly and upwardly from below the frontal surface of an instrument panel of a vehicle and between the frontal surface and the knees of a seated occupant. Another feature is that the cushion is stored when deflated in a rolled condition, and when inflated, unrolls or walks up the knees and upper leg portions of a seated occupant and the frontal surface of the instrument panel and engages the torso of the seated occupant after unrolling to apply a rearward and downward force to the seated occupant and fill the space between the seated occupant and the frontal surface of the instrument panel.

These and other features of the invention will be readily apparent from the following specification and drawings wherein.

Figure 1:
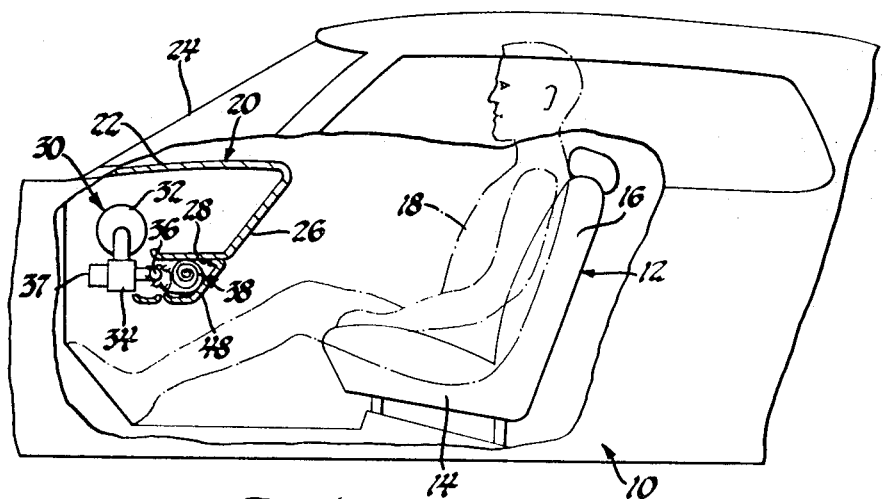
FIG. 1 is a partial view of a vehicle having an occupant restraint according to this invention mounted thereon, with the cushion being shown in a stored rolled condition.

Referring now particularly to FIG. 1 of the drawings, a vehicle 10 is indicated schematically and includes a front seat 12 having a seat cushion 14 and a seat back 16 for supporting an occupant 18 in seated condition. The occupant 18 is indicated as a 95th percentile male seated on the right-hand front seat of the vehicle.

The instrument panel 20 of the vehicle includes an upper surface 22 which faces the windshield 24 of the vehicle, a frontal surface 26 which is located in generally spaced juxtaposed relationship to the seat back 16 and torso of the seated occupant, and a lower surface 28 which projects laterally of the frontal surface.

A conventional air cushion restraint system 30 is schematically shown as including a pressure vessel 32 containing fluid, such as air, nitrogen, or carbon dioxide, under pressure and sealed by a rupturable diaphragm. The vessel 32 communicates with a manifold system 34 including a diffuser tube 36 which extends generally transversely of the vehicle and seated occupant below the frontal surface 26 of the instrument panel. A sensor 37 senses acceleration pulses applied to the vehicle 10, and when a pulse of predetermined amplitude and time is received, the sensor fires a squib to rupture the diaphragm of the vessel 32 and release the supply of pressure fluid to the manifold 34 and diffuser tube 36.

A cushion 38 according to this invention is inflated by the pressure fluid from the diffuser tube and provides a restraint limiting the movement of the seated occupant with respect to the windshield 24 and the frontal surface 26 of the instrument panel.

Figure 3:
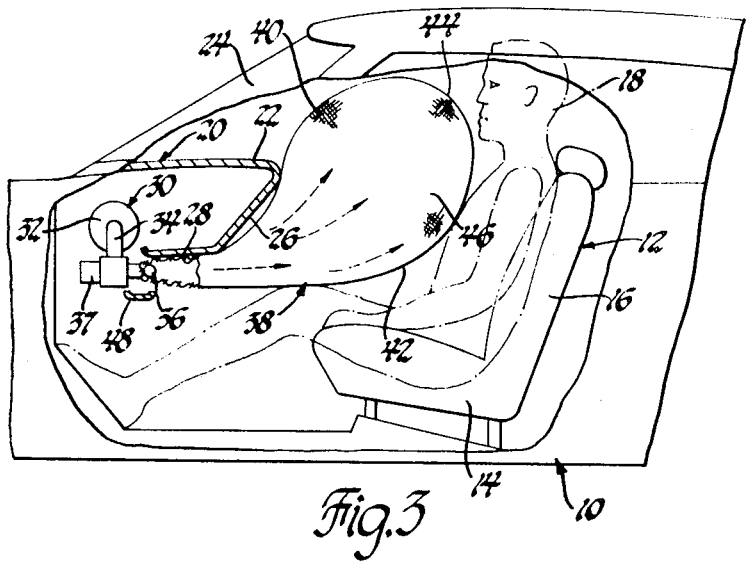
FIG. 3 is a view similar to FIG. 1 showing the cushion in fully inflated condition.

As best shown in FIG. 3, the cushion 38 includes an upper wall portion 40, a lower wall portion 42, and an arcuate end wall portion 44 at one end thereof which joins the wall portions 40 and 42. Side wall portions 46 are joined to the edges of the wall portions 40, 42 and 44 to complete the cushion 38. The other end of the cushion 38 is wrapped around the diffuser tube 36 as shown and suitably secured thereto in order to communicate the interior of the cushion with the manifold and pressure vessel.

When the cushion is deflated, the side wall portions 46 of the cushion are folded upon themselves, inwardly of the wall portions 40, 42 and 44, to thereby locate the wall portions 40 and 42 in engagement with each other and fold the wall portion 44 upon itself so that the cushion is generally flat. The cushion is then rolled upon itself forwardly of the vehicle or toward the frontal surface 26 of the instrument panel with the roll extending from the upper wall portion 40 of the cushion. The cushion in a rolled deflated condition is shown in FIG. 1 as being stored adjacent the lower surface 28 of the instrument panel. Any suitable housing 48 may be provided for the stored cushion as long as the housing will not block deployment of the cushion 38 when it is inflated.

Figure 2:
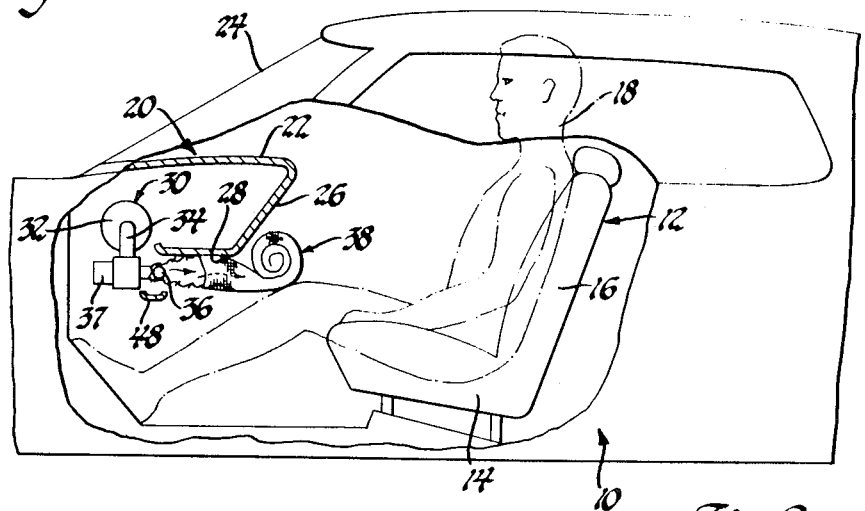
FIG. 2 is a view similar to FIG. 1 showing the cushion unrolling upon initial inflation thereof.

Should the vehicle 10 receive an acceleration pulse of the required amplitude and time, the pressure fluid will be released from the vessel 32 as previously described. Upon initial inflation of the cushion 38, the cushion will start to unroll along the lower surface 28 of the instrument panel and then initially engage the knees of the seated occupant 18. Upon further inflation of the cushion, the upper wall portion 40 of the cushion unrolls along the frontal surface 26 of the instrument panel while the lower wall portion 42 of the cushion unrolls along the upper leg portions of the occupant as shown in FIG. 2. Upon full inflation of the cushion, the end wall portion 44 engages the torso of the seated occupant as shown in FIG. 3 so that the cushion thereby applies a rearward and downward force to the seated occupant as well as filling the space between the frontal surface of the instrument panel and the windshield 24 and the occupant.

From the foregoing description, it can be seen that the cushion is deployed in a direction generally rearwardly and upwardly of the vehicle between the frontal surface of the instrument panel and the occupant's knees. The cushion initially engages the knees of the seated occupant so that any initial forceful blow is received by a strong portion of the occupant's skeletal structure. Further, the cushion unrolls or walks up and along the occupant as well as the frontal surface of the instrument panel to further reduce the likelihood of any portion of the occupant, whether in the proper seated attitude or otherwise, receiving a forceful blow upon deployment of the cushion.

The sidewall portions 46 of the cushion 38 are located parallel to each other and also to the longitudinal center line of the vehicle. However, it should be noted that such wall portions can be located angularly with respect to each other and to the center line of the vehicle or parallel to each other and angularly to the center line of the vehicle. In certain installations, the cushion 38 may be intended for use by both the right-hand and the center front seat passengers and the diffuser tube 36 may not extend fully across the seating area occupied by both passengers. In such instance, the left-hand sidewall portion 46 of the cushion may have to be angularly located with respect to the longitudinal centerline of the vehicle to ensure that the end wall portion 44 may be in a position to be engaged by the center seat passenger.

Although not shown, the cushion 38 may be provided with various types of controls for releasing the fluid contained therein upon impact of the cushion by a seated occupant.

The cushion 38, shown in FIG. 3, is generally of tear drop cross sectional shape longitudinally of the vehicle. As is more fully set forth in copending application A-14,427, Ser. No. 35,954, filed May 11, 1970, and assigned to the assignee of this invention, a cushion of this particular shape has several advantages. However, the cushion restraint of this invention may work with equal success with other cushion shapes.

Thus, this invention provides an improved occupant restraint.

We claim:

1. In combination with a vehicle including a seat having a seat cushion and a seat back for supporting an occupant in seated position, an instrument panel having a frontal surface juxtaposed to the seat back and torso of a seated occupant, and a source of pressure fluid releasable in response to the vehicle receiving an acceleration pulse of predetermined amplitude and time, an occupant restraint comprising, an inflatable cushion having upper and lower wall portions joined adjacent one end of the cushion by an end wall portion, means mounting the other end of the cushion of the vehicle below the frontal surface of the instrument panel, means communicating the cushion with the source of pressure fluid, the cushion in deflated condition being rolled upon itself and located below the frontal surface of the instrument panel with the roll extending from the upper wall portion thereof, the cushion, upon inflation by the pressure fluid, unrolling along the frontal surface of the instrument panel, the lower wall portion unrolling along the knees and upper leg portions of the seated occupant, and the end wall portion engaging the torso of the seated occupant to thereby apply a downward and rearward force on the seated occupant and fill the space between the frontal surface of the instrument panel and the upper leg portions and torso of the seated occupant.

PO-1050
(5/69)

UNITED STATES PATENT OFFICE
CERTIFICATE OF CORRECTION

Patent No. __3,618,978__     Dated __November 9, 1971__

Inventor(s) __Edwin H. Klove, Jr., James S. McDaniel, and James L. No.__

It is certified that error appears in the above-identified patent and that said Letters Patent are hereby corrected as shown below:

Column 4, line 14, "of" (second occurrence) should read -- on --.

Column 4, line 20, after "unrolling" the following should be inserted -- toward the seated occupant with the upper wall portion unrolling --.

Column 4, line 24, "down ward" should read -- downward --.

Signed and sealed this 2nd day of May 1972.

(SEAL)
Attest:

EDWARD M. FLETCHER, JR.
Attesting Officer

ROBERT GOTTSCHALK
Commissioner of Patents